United States Patent [19]

Ohmamyuda et al.

[11] Patent Number: 5,251,000
[45] Date of Patent: Oct. 5, 1993

[54] APPARATUS FOR MEASURING A DISTANCE BETWEEN TWO RUNNING VEHICLES USING LIGHT WAVE

[75] Inventors: Yukio Ohmamyuda, Sagamihara; Shigeru Kimura, Yokohama; Toru Tanabe, Machida; Takao Seto, Yokohama; Kazuhisa Iwasaki, Yokohama; Hideki Kitamura, Yokohama; Yasushi Senoo, Yokohama, all of Japan

[73] Assignee: Stanley Electric Co., Ltd., Tokyo, Japan

[21] Appl. No.: 988,782

[22] Filed: Dec. 10, 1992

[30] Foreign Application Priority Data

Dec. 16, 1991 [JP] Japan ................................ 3-351816

[51] Int. Cl.5 .............................................. G01C 3/08
[52] U.S. Cl. ........................................... 356/5; 356/4
[58] Field of Search ................ 356/5, 4; 342/135; 368/118; 328/129.1, 155

[56] References Cited

U.S. PATENT DOCUMENTS

| 4,615,617 | 10/1986 | Frank et al. | 356/5 |
| 4,620,788 | 11/1986 | Giger | 356/5 |
| 4,699,508 | 10/1987 | Bölkow et al. | 356/5 |
| 4,859,054 | 8/1989 | Harrison | 356/5 |
| 5,050,986 | 9/1991 | Gatto et al. | 356/5 |

*Primary Examiner*—Mark Hellner
*Attorney, Agent, or Firm*—Frishauf, Holtz, Goodman & Woodward

[57] ABSTRACT

To measure a distance between two running vehicles a measurement signal is first generated by irradiating a light beam toward an article to be measured and then receiving the reflected light beam from the article. A reference signal and the measurement signal generated in the above way are input to a digital mix-down circuit which comprises two-stage flip-flop circuit to determine a phase difference between the reference signal and the measurement signal. The apparatus includes a clock delay circuit for delaying the high-going (rising) edge of the measurement signal while the reference signal is going high at an output terminal of a flip-flop circuit on the input side of the digital mix-down circuit, and a data delay circuit for delaying the down-going (falling) edge of the reference signal input into a data terminal of the flip-flop circuit. Usually, the clock delay circuit is electrically connected to the digital mix-down circuit via the data delay circuit, while the data delay circuit is electrically connected directly to the digital mix-down circuit. Alternatively, both the clock delay circuit and the data delay circuit may be electrically connected directly to the digital mix-down circuit.

3 Claims, 3 Drawing Sheets

APPARATUS FOR MEASURING A DISTANCE BETWEEN TWO RUNNING VEHICLES USING LIGHT WAVE

BACKGROUND OF THE INVENTION

1. Field of the Invention

The present invention relates generally to an apparatus for measuring a distance between a reference location and an article to be measured using a light wave by irradiating, e.g., a laser light beam to the article and receiving the light beam reflected from the article so as to determine a time that elapses from the irradiation of the light beam until the receipt of the reflected light beam, wherein the distance is determined based on the foregoing time that elapses during the round trip of the irradiated light beam. More particularly, the present invention relates to an apparatus for measuring a distance between a first vehicle and a second vehicle running ahead of the first vehicle using a light wave in order to prevent a collision of the first vehicle with the second vehicle based on the measured distance therebetween.

2. Background Art

To facilitate understanding of the present invention, a typical conventional apparatus 90 of the aforementioned type as shown in FIG. 6 will be described below with reference to FIG. 6 to FIG. 9.

The apparatus 90 includes an oscillator 91, a driving circuit 92 and a light generating section 93. In response to an output from the oscillator 91 via the driving circuit 92, measurement light beam L1 is irradiated from the light generating section 93 toward an article X to be measured. Subsequently, reflected light beam L2 is received by a light receiving section 94 which in turn generates a measurement signal S1. The measurement signal S1 is amplified in an amplifying circuit 95 in which its shape is properly corrected. Thereafter, the measurement signal S1 is input into a digital mix-down circuit 96 in which a phase difference between the measurement signal S1 and a reference signal S2 output from a local oscillator 97 is determined. Subsequently, a processing unit 98 including a microcomputer and other elements is activated to calculate a distance between the apparatus 90 and the article X based on the result derived from the determination of the phase difference and then display it on the screen of a displaying unit 99.

FIG. 7 is an illustrative view which shows the detailed structure of the digital mix-down circuit 96. As is apparent from the drawing, the digital mix-down circuit 96 is constructed of two-stage flip-flop circuits comprising a flip-flop circuit U1 on the input side and a flip-flop circuit U2 on the output side. Specifically, the reference signal S2 is input into a data terminal D of the FF circuit U1, and at the same time, the measurement signal S1 is input into a clock terminal Ck of the FF circuit U1. An output from an output terminal Q1 of the FF circuit U1 is input into a clock terminal Ck of the FF circuit U2, and at the same time, a data terminal D is electrically connected to an inverted output terminal Q2 of the FF circuit U2. The FF circuit U2 is electrically connected to the processing unit 98 via an output terminal Q1.

FIG. 8 shows wave shape charts, each of which illustrates a mode of operation of the digital mix-down circuit 96. First, the reference signal S2 which has been input into the data terminal D of the FF circuit U1 is latched by the measurement signal S1 which has been input into the clock terminal Ck of the same, and thereafter, the foregoing latched state is output to the output terminal Q1 of the FF circuit U2 as a "H" level.

When it is assumed that a frequency of the reference signal S2 is the same as that of the measurement signal S1 at this time, this means that the measurement signal S1 is delayed from the reference signal S2 by a time corresponding to the round trip time of the irradiated light beam between the apparatus 90 and the article X. Thus, as measurement is repeatedly conducted, the delay time is sequentially added to the preceding delay time until the measurement signal S1 is delayed from the reference signal S2 by a time corresponding to a half frequency. Consequently, the reference circuit S2 is latched by the measurement signal S1 at a "L" level, causing the reference signal S2 to be output to the output terminal Q1 of the FF circuit U2 at the "L" level. Subsequently, the result of measurement is repeatedly output from the output terminal Q1 of the FF circuit U2 at the "L" level or at the "H" level, depending on a frequency difference between the measurement signal S1 and the reference signal S2. In other words, the digital mix-down circuit 96 serves as a so-called heterodyne circuit the output of which is attenuated in the FF circuit U2 to exhibit a half frequency which in turn is input into the processing unit 98 to calculate the distance between the apparatus 90 and the article X.

With the conventional digital mix-down circuit 96 as described above with reference to FIG. 6 to FIG. 8, because of the fact that the round trip time of the irradiated light beam between the apparatus 90 and the article X is basically very short, there arises a malfunction that the measurement signal S1 erroneously latches a reverse level to a level to be originally latched due to slight fluctuation of circuit conditions or measurement conditions within a period of several frequencies before and after the time when the reference signal S2 shifts from the "L" level to the "H" level, causing an error to be induced. Similarly, this error is induced also within a period of several frequencies before and after the time when the reference signal S2 shifts from the "H" level to the "L" level. Consequently, a problem to be solved is that measurement accuracy is remarkably reduced.

SUMMARY OF THE INVENTION

The present invention has been made in consideration of the foregoing background.

An object of the present invention is to provide an apparatus for measuring a distance between a first vehicle and a second vehicle running ahead of the first vehicle, using a light wave, wherein the apparatus assures that the distance between the first vehicle and the second vehicle can be measured without substantial reduction of measurement accuracy irrespective of fluctuation of circuit conditions and measurement conditions, especially when a measurement signal shifts from a "L" level to a "H" level, and vice versa in a digital mix-down circuit.

According to the present invention, there is provided an apparatus for measuring a distance between a first vehicle and a second vehicle running ahead of the first vehicle using a light wave, wherein a reference signal and a measurement signal generated by way of the steps of irradiating a measurement light beam toward an article to be measured and then receiving the reflected light beam from the article are input into a digital mix-down circuit, wherein the digital mix-down circuit comprises two-stage flip-flop circuits to determine a phase difference between the reference signal and the measurement signal. The apparatus also includes a clock delay circuit for delaying the high-going edge of the measurement signal while the reference signal is going high at an output terminal of a flip-flop circuit on the input side of the digital mix-down circuit, the clock delay circuit being electrically connected to the digital mix-down circuit; and a data delay circuit for delaying the down-going edge of the reference signal input into a data terminal of the flip-flop circuit, the data delay circuit being electrically connected to the digital mix-down circuit.

Usually, the clock delay circuit is electrically connected to the digital mix-down circuit via the data delay circuit. In other words, the clock delay circuit and the data delay circuit are separately electrically connected to the digital mix-down circuit.

Alternatively, the clock delay circuit may be electrically connected directly to the digital mix-down circuit. In this case, not only the clock delay circuit but also the data delay circuit are electrically connected directly to the digital mix-down circuit.

Other objects, features and advantages of the present invention will become apparent from reading of the following description which has been made in conjunction with the accompanying drawings.

DETAILED DESCRIPTION OF THE PREFERRED EMBODIMENTS

The present invention will now be described in detail hereinafter with reference to the accompanying drawings which illustrate an apparatus for measuring a distance between two running vehicles using a light wave (hereinafter referred to simply as an apparatus) in accordance with a preferred embodiment of the present invention.

Figure 1:
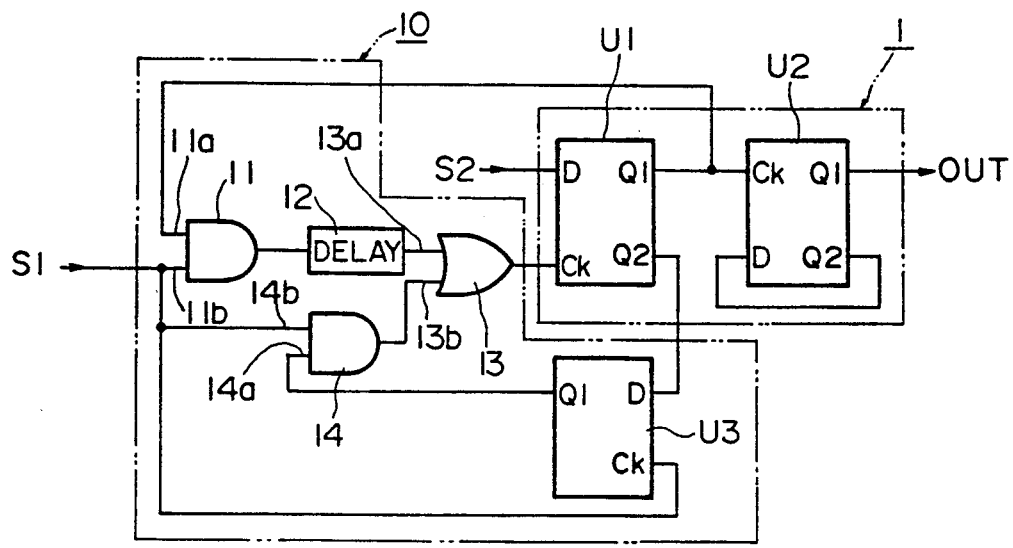
FIG. 1 is a block diagram which shows a digital mix-down circuit and a clock delay circuit for an apparatus for measuring a distance between two running vehicles using a light wave in accordance with an embodiment of the present invention.

In FIG. 1, reference numeral 1 designates a digital mix-down circuit. The digital mix-down circuit 1 includes a flip-flop circuit U1 on the input side (hereinafter referred to simply as a FF circuit U1) of which clock terminal Ck is electrically connected to a clock delay circuit 10. While a digital step-type reference signal S2 is going high at an output terminal Q1 of the FF circuit U1 as the clock delay circuit 10 is activated, the going-high edge of a digital step-type measurement signal S1 input into the clock terminal Ck of the flip-flop circuit U1 via the clock delay circuit 10 is caused to delay.

The structure and operation of the clock delay circuit 10 will be described below.

The measurement signal is connected to one input terminal 11a of a first AND gate 11. other input terminal 11b of the first AND gate 11 is electrically connected to the output terminal Q1 of the FF circuit U1, an output terminal of the first AND gate 11 is electrically connected to an input terminal of a delay section 12, and an output terminal of the delay section 12 is electrically connected to one input terminal 13a of an OR gate 13, the output of which is electrically connected to the clock terminal Ck of the FF circuit U1.

In addition, a data terminal D of a third FF circuit U3 of the clock delay circuit 10 is electrically connected to an inverted output terminal Q2 of the FF circuit U1. The measurement signal S1 is input into a clock terminal Ck of the third FF circuit U3. One input terminal 14a of a second AND gate 14 is electrically connected to an output terminal Q1 of the third FF circuit U3, and the output of the second AND circuit 14 is electrically connected to one input terminal 13b of the OR gate 13.

With the delay circuit 10 constructed in the above-described manner, no output arises at the output terminal Q1 of the FF circuit U1. In other words, while the delay circuit 10 is activated at a "L" level, the measurement signal S1 is input into the input terminal 11b of the first AND gate 11 at the "L" level, whereby no output arises at the output terminal Q1 of the FF circuit U1 irrespective of the level of the measurement signal S1 input into the one input terminal 11b of the AND gate 11. Consequently, the measurement signal S1 is not transmitted to the clock terminal Ck of the FF circuit U1 via the delay section 12 by any means.

At the same time, while no output arises at the output terminal Q1 of the FF circuit U1, the inverted output terminal Q2 of the FF circuit U1 is held at a "H" level, causing the "H" level to be applied to the data terminal D of the third FF circuit U3. Thus, the high-going (rising) edge of the measurement signal S1 input into the clock terminal Ck of the third FF circuit U3 allows the measurement signal S1 held at the "H" level to be latched at the output terminal Q1 of third FF circuit U3 and then output therefrom.

Thus, the one input terminal 14a of the second AND gate 14 is held at the "H" level, whereby the measurement signal S1 input into the other input terminal 14b of the second AND gate 14 is output to an output terminal of the second AND gate 14 at the same level without any delay in respect of the level of the measurement signal S1. The foregoing output is applied to the clock terminal Ck of the FF circuit U1.

When the output terminal Q1 of the FF circuit U1 varies to the "H" level, the inverted output terminal Q2 of the FF circuit U1 varies to the "L" level. Thus, the high-going (rising) edge of the measurement signal S1 input into the clock terminal Ck of the third FF circuit U3 allows the measurement signal S1 held at the "L" level to be latched at the output terminal Q1 of the FF circuit U1 and then output therefrom. Consequently, the one input terminal 14a of the second AND gate 14 is set to the "L" level, causing the second AND gate 14 to stop outputting therefrom.

Figure 2:
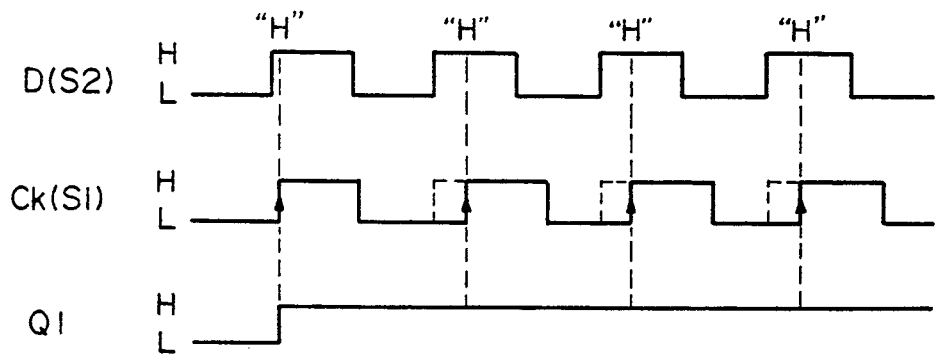
FIG. 2 shows wave shape charts each of which shows a mode of operation of the block delay circuit shown in FIG. 1.

At the same time, the one input terminal 11a of the first AND gate 11 varies to the "H" level, whereby the measurement signal S1 input into the other input terminal 11b of the first AND gate 11 is output to an output terminal of the first AND gate 11 as it is, and thereafter, it is input into the delay section 12 at which the measurement signal S1 is applied to the clock terminal Ck of the FF circuit U1 with delay of a predetermined time from the original position thereof represented by a dashed line in FIG. 2.

As is apparent from FIG. 2, since the measurement signal S1 applied to the clock terminal Ck of the FF circuit U1 delays immediately after the output terminal Q1 of the FF circuit U1 varies to the "H" level, a time difference between the measurement signal S1 and a reference signal S2 applied to the data terminal D of the FF circuit U1 is enlarged, resulting in any erroneous operation failing to be performed even when the aforementioned fluctuation occurs.

When the output terminal Q1 of the FF circuit U1 varies from the "H" level to the "L" level, the clock delay circuit 10 is restored to the "L" level state at the output terminal Q1 of the FF circuit U1 as mentioned above. Thus, there is no possibility that measurement accuracy is degraded when the output terminal Q1 of the FF circuit U1 is subsequently shifted from the "L" level to the "H" level.

Figure 3:
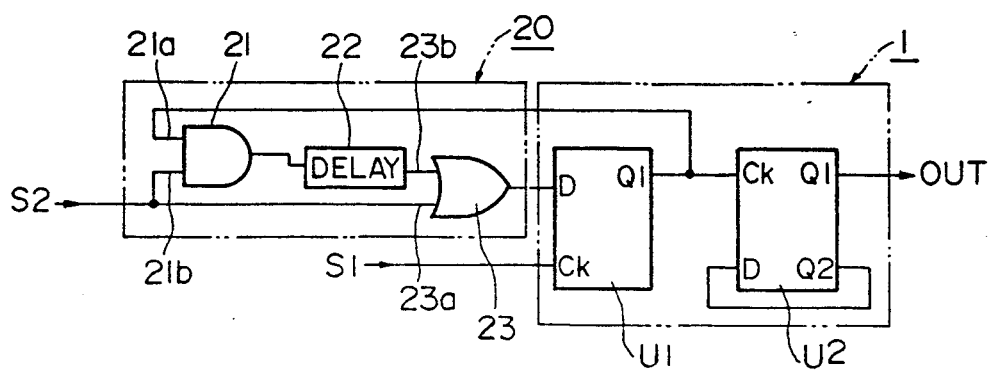
FIG. 3 is a block diagram which shows the digital mix-down circuit and a data delay circuit for the apparatus in accordance with the embodiment of the present invention.

Next, FIG. 3 is a block diagram of the digital mix-down circuit 1 to which a data delay circuit 20 is electrically connected. Specifically, the output of data delay circuit 20 is electrically connected to the data terminal D of the FF circuit U1 in the digital mix-down circuit 1.

The structure and operation of the data delay circuit 20 will be described in detail below.

The reference signal S2 one input terminal 21b of AND gate 21. The other input terminal 21a of AND gate 21 is electrically connected to the output terminal Q1 of the FF circuit U1, and an output from the AND gate 21 is input into a delay section 22.

The output from the delay section 22 is electrically connected to one input terminal 23b of an OR gate 23 having the reference signal S2 received at input 23a thereof, and an output from the OR gate 23 is transmitted to the data terminal D of the FF circuit U1.

With the data delay circuit 20 constructed in the above-described manner, when the output terminal Q1 of the FF circuit U1 is held at the "L" level, the one input terminal 21a of the AND gate 21 is held also at the "L" level, whereby no output arises at the output terminal of the AND gate 21 irrespective of the level of the reference signal S2 applied to the other input terminal 21b of the AND gate 21. Thus, the delay section 22 does not operate.

Since the reference signal S2 is input into the data terminal D of the FF circuit U1 via an OR gate 23 at this time, this substantially represents the operative state wherein the reference signal S2 is input directly into the data terminal D of the FF circuit U1.

When the output terminal Q1 of the FF circuit U1 is shifted from the "L" level to the "H" level, the reference signal S2 is input into the one input terminal 21a of the AND gate 21 at the "H" level, whereby it is input into the delay section 22 via the AND gate 21 as it is. Then, the delay section 22 causes the high-going (rising) edge of the reference signal S2 and the low-going (falling) edge of the reference signal S2 to delay for a predetermined time. Thus, the reference signal S2 is input into the date terminal D of the FF circuit U1 via the OR gate 23 while the foregoing delay is maintained.

Since the measurement signal S1 and the reference signal S2 are simultaneously input into the data terminal D of the FF circuit U1 in the digital mix-down circuit 1 via the OR gate 23, the reference signal S2 which has caused to delay in the delay section 22 and the reference signal S2 having an original shape overlap each other in the OR gate 23. As a result, the reference signal S2 exhibits a shape delaying from the original position represented by dashed line by a quantity corresponding to the low-going (falling) edge thereof as shown in FIG. 4 so that it is input into the data terminal D of the FF circuit U1 while the delayed shape of the reference signal S2 is maintained.

Figure 4:
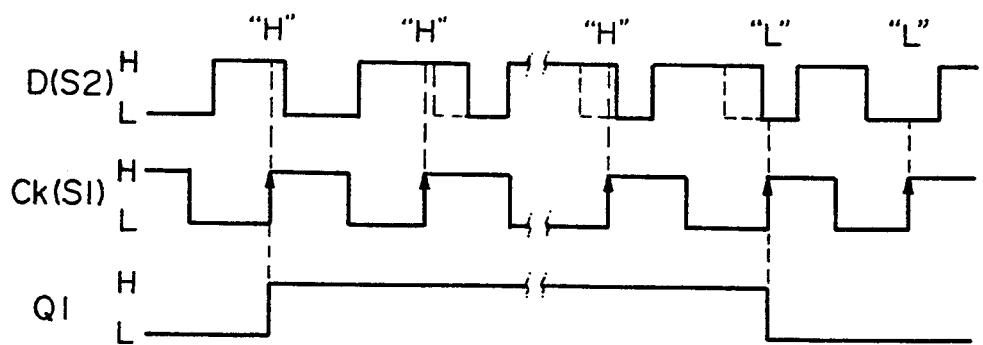
FIG. 4 shows wave shape charts each of which shows a mode of operation of the data delay circuit shown in FIG. 3.

As is apparent from FIG. 4, the delaying caused by the low-going (falling) edge of the reference signal S2 applied to the data terminal D of the FF circuit U1 is stopped immediately after the output terminal Q1 of the FF circuit U1 changes to the "L" level. Thus, a time difference between the high-going (rising) edge of the measurement signal S1 applied to the clock terminal Ck of the FF circuit U1 and the low-going (falling) edge of the reference signal S2 is enlarged, whereby an erroneous operation for causing the output terminal Q1 of the FF circuit U1 to vary to "H" level again is not performed by any means.

Figure 5:
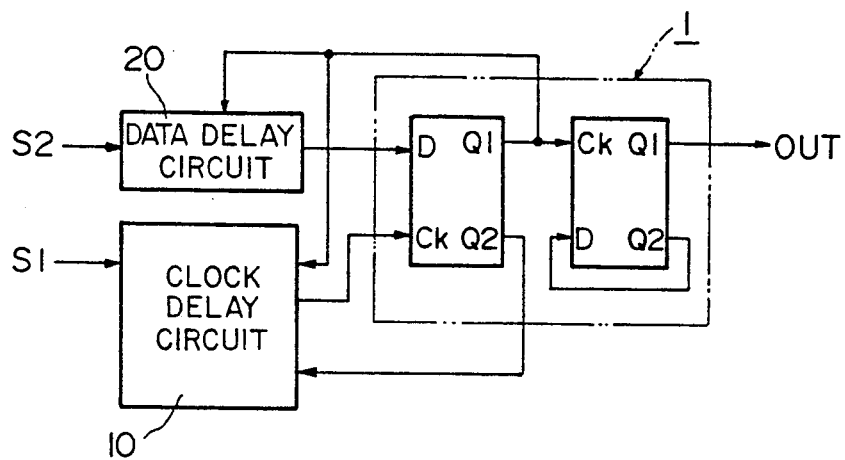
FIG. 5 is a block diagram which shows the digital mix-down circuit including the clock delay circuit and the data delay circuit in accordance with the embodiment of the present invention.
Figure 6:
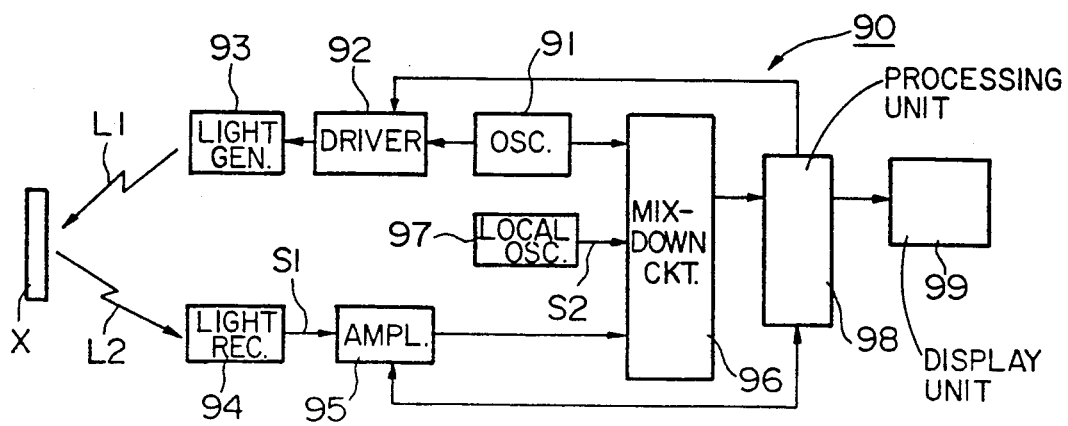
FIG. 6 is a block diagram which shows the structure of a conventional apparatus for measuring a distance between two running vehicles using a light wave.
Figure 7:
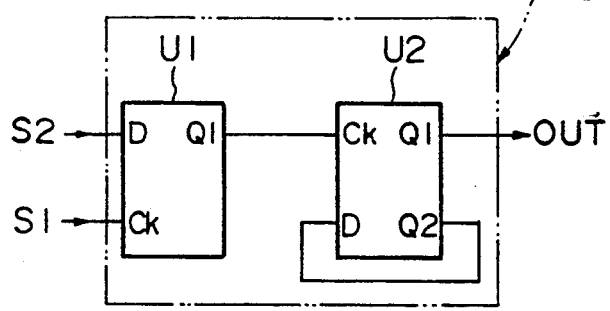
FIG. 7 is a block diagram which shows a digital mix-down circuit for the conventional apparatus shown in FIG. 6.
Figure 8:
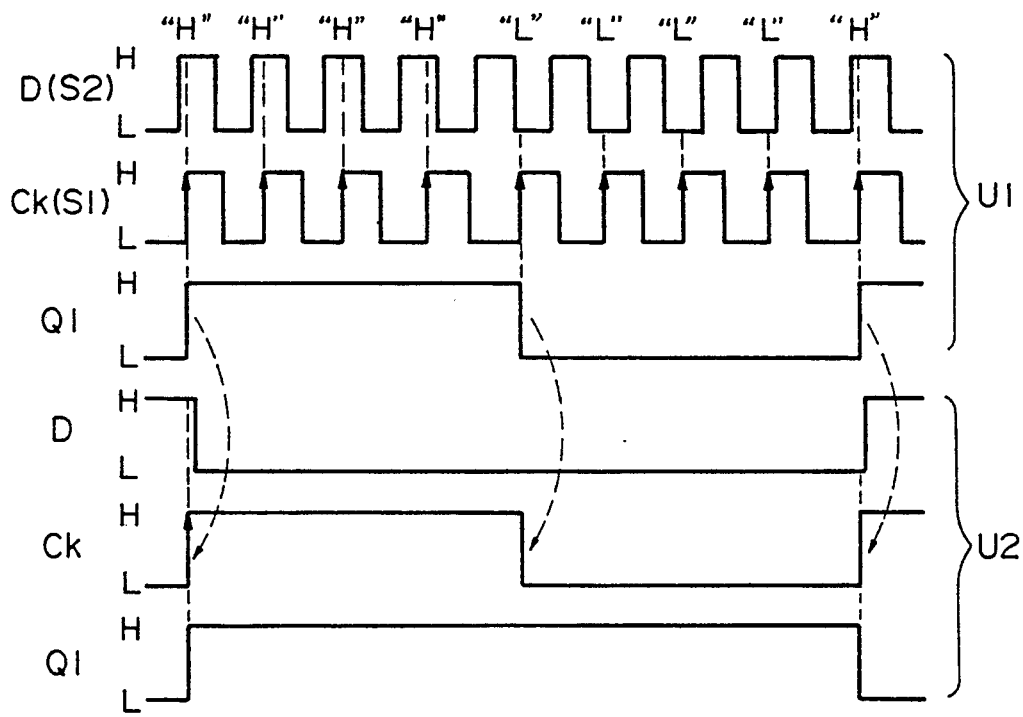
FIG. 8 shows wave shape charts each of which shows a mode of operation of the digital mix-down circuit for the conventional apparatus.
Figure 9:
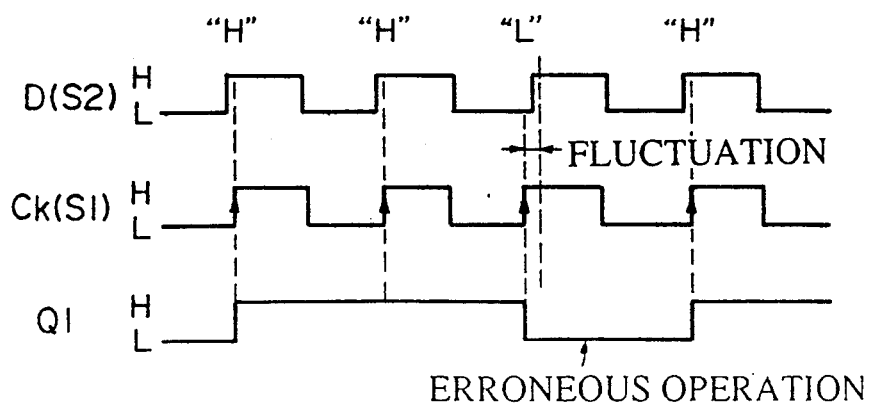
FIG. 9 shows wave shape diagrams each of which shows by way of example an erroneous operation of the digital mix-down circuit for the conventional apparatus.

The present invention has been described above with respect to the embodiment wherein the clock delay circuit 10 and the data delay circuit 20 are separately electrically connected to the digital mix-down circuit 1. Alternatively, as shown in FIG. 5, the clock delay circuit 10 and the data delay circuit 20 may be electrically connected directly to the digital mix-down circuit 1. Also in this case, the measurement signal S1 and the reference signal S2 are caused to be delayed in the same manner as described above with reference to FIG. 2 and FIG. 4.

Next, a mode of operation of the apparatus constructed in the aforementioned manner will be described below.

Since the apparatus includes the clock delay circuit 10 for delaying the high-going (rising) edge of the measurement signal S1 input into the clock terminal Ck thereof and the data delay circuit 20 for delaying the low-going (falling) edge of the reference signal S2 input into the data terminal D thereof, the high-going (rising) edge of the measurement signal S1 as well as the low-going (falling) edge of the same and the high-going (rising) edge of the reference signal S2 come very near to each other in terms of a time not only at the time when the output terminal Q1 of the FF circuit U1 varies from the "L" level to the "H" level but also at the time when it varies from the "H" level to the "L" level. There does not arise a malfunction that the level of the reference signal S2 once output from the output terminal Q1 of the FF circuit U1 is inverted due a slight fluctuation of circuit conditions or measurement conditions, causing an erroneous operation to be readily performed.

Since the output terminal Q1 of the FF circuit U1 is electrically connected to a clock terminal Ck of a second FF circuit U2, at that time while either of the measurement signal S1 and the reference signal S2 is going high (rising), it should be noted that the output terminal Q1 of the second FF circuit U2 is activated only at the time when the output terminal Q1 of the FF circuit U1 varies from the "L" level to the "H" level, i.e., only in the operative state before both the clock delay circuit 10 and the data delay circuit 20 operate. Consequently, the original measurement accuracy of the apparatus is not adversely affected not only by the clock delay circuit 10 but also the data delay circuit 20.

While the present invention has been described above with respect to preferred embodiments thereof, it should of course be understood that the present invention should not be limited only to the shown embodiments, but that various changes or modifications may be made without departure from the scope of the present invention as defined by the appended claims.

What is claimed is:

1. An apparatus for measuring a distance between a first vehicle and a second vehicle running ahead of said first vehicle using a light wave, comprising:
   means for irradiating a measurement light beam from said first vehicle toward said second vehicle;
   means for receiving the reflected measurement light beam from said second vehicle and for converting the received reflected measurement light beam into a step-type measurement signal;
   digital mix-down circuit means, including a two-stage flip-flop circuit, for determining a phase difference between a step-type reference signal and said step-type measurement signal;
   clock delay circuit means coupled to said digital mix-down circuit means for delaying a rising edge of said step-type measurement signal while said step-type reference signal is going high at an output terminal of said flip-flop circuit on an input side of said digital mix-down circuit means; and
   data delay circuit means coupled to said digital mix-down circuit means for delaying a falling edge of said step type reference signal which is input into a data terminal of said flip-flop circuit of said digital mix-down circuit means;
   said digital mix-down circuit means providing an output corresponding to the distance between said first and second vehicles.

2. The apparatus of claim 1, wherein said clock delay circuit means is electrically coupled to said digital mix-down circuit means via said data delay circuit means.

3. The apparatus of claim 1, wherein said clock delay circuit means is electrically connected directly to said digital mix-down circuit means.

* * * * *